United States Patent
Ruggeri et al.

(10) Patent No.: US 12,496,681 B2
(45) Date of Patent: Dec. 16, 2025

(54) BALANCING SYSTEM FOR A ROTATING SPINDLE OF A MACHINE TOOL AND RELATIVE CONTROL METHOD

(71) Applicant: Marposs Societa' Per Azioni, Bentivoglio (IT)

(72) Inventors: Alessandro Ruggeri, Bologna (IT); Andrea Turrini, Bologna (IT); Daniele Lanzoni, Cento (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 929 days.

(21) Appl. No.: 17/440,837

(22) PCT Filed: Mar. 26, 2020

(86) PCT No.: PCT/EP2020/058633
§ 371 (c)(1),
(2) Date: Sep. 20, 2021

(87) PCT Pub. No.: WO2020/201035
PCT Pub. Date: Oct. 8, 2020

(65) Prior Publication Data
US 2022/0161389 A1    May 26, 2022

(30) Foreign Application Priority Data
Mar. 29, 2019  (IT) .................. 102019000004703

(51) Int. Cl.
*B24B 41/04*      (2006.01)
*G01M 1/36*      (2006.01)
(52) U.S. Cl.
CPC ............. *B24B 41/042* (2013.01); *G01M 1/36* (2013.01)

(58) Field of Classification Search
CPC .............................. B24B 41/042; G01M 1/36
See application file for complete search history.

(56) References Cited

U.S. PATENT DOCUMENTS

2002/0170001 A1* 11/2002 Fujita .................. G06F 11/1433
714/E11.135
2003/0088346 A1   5/2003 Calkins et al.
(Continued)

FOREIGN PATENT DOCUMENTS

EP        0 690 979 A1   1/1996
EP         1870198  *  6/2007   ............... B23Q 1/00
(Continued)

*Primary Examiner* — Tameem D Siddiquee
(74) *Attorney, Agent, or Firm* — Blank Rome LLP

(57) ABSTRACT

Balancing system for a rotating spindle (3) of a machine tool (1); the balancing system has a rotating part comprising a balancing head (7) with at least one balancing mass (8) and at least one electric motor (9) which is adapted to regulate the position of the balancing mass; the rotating part also includes a vibration sensor (10) and a control system (11) with at least one hardware (12) and at least one software (13) executed by the hardware; the balancing system also includes a two-way contactless communication system (14) which establishes communication between the rotating control system and a fixed processing and control electronics (15) connected to a machine tool control unit (20). The software of the control system features: a management application (19) which performs all the management of the balancing head and the vibration sensor during normal operation, and a service application (18) which, when the control system is powered after a suspension of the power supply, automatically starts up and starts the management application or, if a software update is required, overwrites the existing version of the management application with a new version.

18 Claims, 2 Drawing Sheets

(56) References Cited

U.S. PATENT DOCUMENTS

| | | | | |
|---|---|---|---|---|
| 2003/0233164 A1* | 12/2003 | Maeda | ................ | G05B 19/408 |
| | | | | 700/180 |
| 2006/0167659 A1* | 7/2006 | Miyasaka | ............... | F16C 19/52 |
| | | | | 702/185 |
| 2011/0208361 A1 | 8/2011 | Hildebrand et al. | | |
| 2020/0075233 A1* | 3/2020 | Lekas | .................... | H01F 27/36 |

FOREIGN PATENT DOCUMENTS

| EP | 1 870 198 A1 | 12/2007 |
|---|---|---|
| EP | 3 134 980 A1 | 3/2017 |
| WO | WO 94/21995 A1 | 9/1994 |
| WO | WO 2015/162154 A1 | 10/2015 |

\* cited by examiner

BALANCING SYSTEM FOR A ROTATING SPINDLE OF A MACHINE TOOL AND RELATIVE CONTROL METHOD

TECHNICAL FIELD

The present invention relates to a balancing system for a rotating spindle of a machine tool and a relative control method.

BACKGROUND ART

As for example it is described in patent applications EP0690979A1, EP1870198A1 and EP3134980A1, a balancing system is known for a rotating spindle (hub) of a machine tool, in particular a grinding machine where the spindle rotates with respect to a frame and supports (at least) one grinding wheel. The balancing system includes a rotating part with a balancing head generally housed in an axial opening of the spindle substantially in correspondence to the grinding wheel, or arranged at one end of the spindle, also axially aligned. The balancing head includes at least one balancing mass eccentric with respect to the rotation axis, whose position is adjustable and is controlled, for example by an electric motor.

Generally, the rotating part carries also a vibration sensor, typically associated with the balancing head and physically integrated in it for practical reasons, for detecting ultrasonic acoustic emissions emitted by the contact between the grinding wheel and the workpiece or between the grinding wheel and a dressing tool (dresser). The electrical signals generated by the vibration sensor are used (in a known way) for controlling the working cycles.

In the rotating part there is an electronics, or control system, which superintend the operation of the balancing head and the vibration sensor and consists of a hardware (typically a microcontroller equipped with a memory) and a software (which is stored in the memory of the microcontroller or in an external memory accessible by the microcontroller).

A two-way contactless communication system is provided which transmits analog and/or digital information between the rotating part, in particular the control system, and a processing and control electronics which is in a fixed position with respect to the frame of the machine tool and is in turn connected to the control unit of the machine tool. In particular, the communication system is used by the processing and control electronics to send control signals to the control system of the rotating part (for example for activating/deactivating the reading of the vibration sensor or for driving the electrical motors that move the balancing masses) and is used in the opposite direction to send diagnostic signals and the reading of the vibration sensor to the processing and control electronics. The analog electrical signal supplied by the vibration sensor can be processed and digitized on board the rotating part or can be transmitted in analog form and processed and digitized in the processing and control electronics. The second option, while requiring greater system complexity, is generally preferred by virtue of the greater flexibility it offers.

A contactless power transmission system is provided to provide the necessary power supply to the control system present in the rotating part. Generally, the power transmission system includes an air-core transformer having the primary winding arranged in a component fixed to the frame of the machine tool and the secondary winding arranged in the rotating part.

Occasionally it is necessary to update the software of the control system of the rotating part and this updating operation, which provides to completely overwrite what is contained in the memory, is relatively long and complex as it requires tooling operations. In particular, to update the software of the control system of the rotating part, the rotating part must be disassembled from the spindle to physically connect the control system hardware—i.e. by means of a cable—to an external computer that overwrites what is contained in the memory with the new version of the software. Once overwriting is finished, the rotating part must be reassembled.

Furthermore, in known balancing systems, the diagnostics that can be provided by the balancing head is limited. In particular, the communication channel defined by the two-way contactless communication system cannot be used to send any digital diagnostic signals generated by the control system of the rotating part when, during the use of the spindle to perform a mechanical processing through the corresponding grinding wheel, such communication channel is engaged to transmit in analog form from the rotating part to the processing and control electronics the reading of the vibration sensor. Consequently, the control system is only able to answer any diagnostic queries coming from the processing and control electronics when the spindle is not working.

DESCRIPTION OF THE INVENTION

The object of the present invention is to provide a balancing system for a rotating spindle of a machine tool and a relative control method, which balancing system is free from the drawbacks described above and, at the same time, is easy and cheap to manufacture.

According to the present invention, a balancing system for a rotating spindle of a machine tool and a relative control method are provided, according to what is claimed in the attached claims.

The claims describe embodiments of the present invention forming an integral part of the present description.

BRIEF DESCRIPTION OF THE DRAWINGS

The present invention will now be described with reference to the attached drawings, which refers to an embodiment and are given as a non-limiting example, wherein.

PREFERRED EMBODIMENTS OF THE INVENTION

Figure 1:
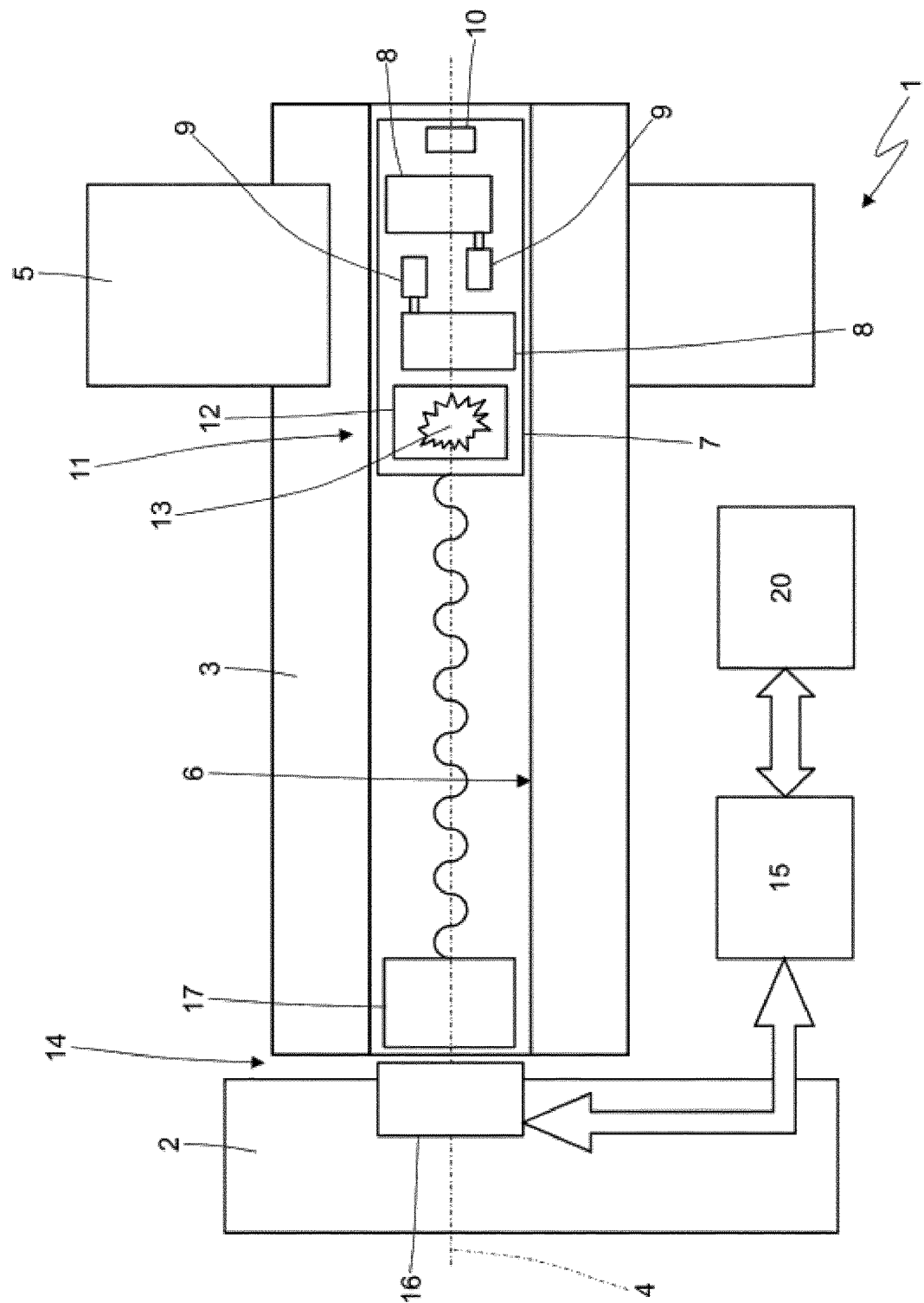
FIG. 1 is a schematic and partial section of a machine tool provided with a rotating spindle which supports a grinding wheel and is equipped with a balancing system.

In FIG. 1, a machine tool, in particular a grinding machine, is shown schematically and partially and is indicated with the reference number 1.

The machine tool 1 comprises a frame 2 which rotatably supports, by interposing bearings, not shown, a spindle 3 so that the latter can rotate around a rotation axis 4.

The spindle 3 supports a grinding wheel 5 by means of a corresponding grinding wheel hub, the latter being removably fixed to the spindle 3 by known and not illustrated means that comprise, for example, a cone clutch. The spindle 3 and the grinding wheel hub define the rotating part of the machine tool 1. The spindle 3 has a central axial opening 6 in which a rotating part of a balancing system with a balancing head 7 is housed. The balancing head 7 is of a known type, and comprises two balancing masses 8, eccentric with respect to the rotation axis 4, and relative electric motors 9 for adjusting the angular position of the balancing masses 8. A vibration sensor 10 (i.e. an acoustic sensor) is also associated with the balancing head 7 and is conventionally considered part of the balancing system. The vibration sensor 10 which, in the preferred embodiment and for practical reasons, is associated with the balancing head 7, and in particular integrated with it, can be differently arranged in the rotating part.

The balancing system with the balancing head 7 and the vibration sensor 10 typically has two functions: balancing the grinding wheel 5, operation that is carried out each time the grinding wheel 5 is replaced, before the grinding wheel 5 is actually used to carry out machining, and whenever it is necessary or is considered appropriate during the life of the grinding wheel, and carrying out a process monitoring through the vibration sensor 10 associated with the balancing head 7.

In this regard it is important to note that the spindle 3 is balanced by the manufacturer, while the grinding wheel 5 which is mounted on it is typically unbalanced and during its life the unbalance of the grinding wheel 5 varies.

Therefore, having the balancing head 7 integral with the grinding wheel 5, so that the former can quickly correct the unbalance of the latter whenever it is needed, has a strong impact on the productivity of the machine tool 1 and on the quality of the workpieces.

The balancing system comprises a control system 11 for controlling the rotating part, which oversees the operation of the balancing head 7 and of the associated vibration sensor 10 and consists of hardware 12 (typically a microcontroller equipped with a memory) and software 13, the latter being stored in the memory of the microcontroller.

The balancing system also includes a stationary part with a processing and control electronics 15 that is supported by the frame 2 of the machine tool 1 and connected to a control unit 20 of the machine tool 1.

A two-way contactless communication system 14 is provided between the rotating part and the stationary part of the balancing system, the communication system being suitable for establishing communication between the control system 11 and the processing and control electronics 15, for transmitting analog and digital information. The communication system 14 is preferably of the optical type and comprises a first transceiver device 16 in the stationary part, coupled to the frame 2 of the machine tool 1, and connected to the processing and control electronics 15 by means of an electric cable (not shown) and a second transceiver device 17 in the rotating part which faces the first transceiver device 16 and is connected to the control system 11 by means of a coiled electric cable which is housed in the axial opening 6.

The communication system 14 is made in a known way, for example according to one of the alternatives described in the aforementioned patent application EP0690979A1, and is not illustrated in detail here.

The communication system 14 is used by the processing and control electronics 15 to send digital control signals to the control system 11 of the rotating part (for example for activating/deactivating the reading of the vibration sensor 10 or for driving the electric motors 9 which move the balancing masses 8) and is used in the opposite direction by the control system 11 of the rotating part to send to the processing and control electronics 15 digital diagnostic signals and the reading, generally in analog form, of the vibration sensor 10.

A wireless power transmission system is provided (generally integrated together with the communication system 14) to provide the necessary power supply to the control system 11 of the rotating part. Generally, the power transmission system comprises an air-core transformer having the primary winding arranged in a component fixed to the frame 2 of the machine tool 1 (for example integrated in the first transceiver device 16) and the secondary winding arranged in the rotating part connected to the spindle 3 (for example integrated in the second transceiver device 17).

Figure 2:
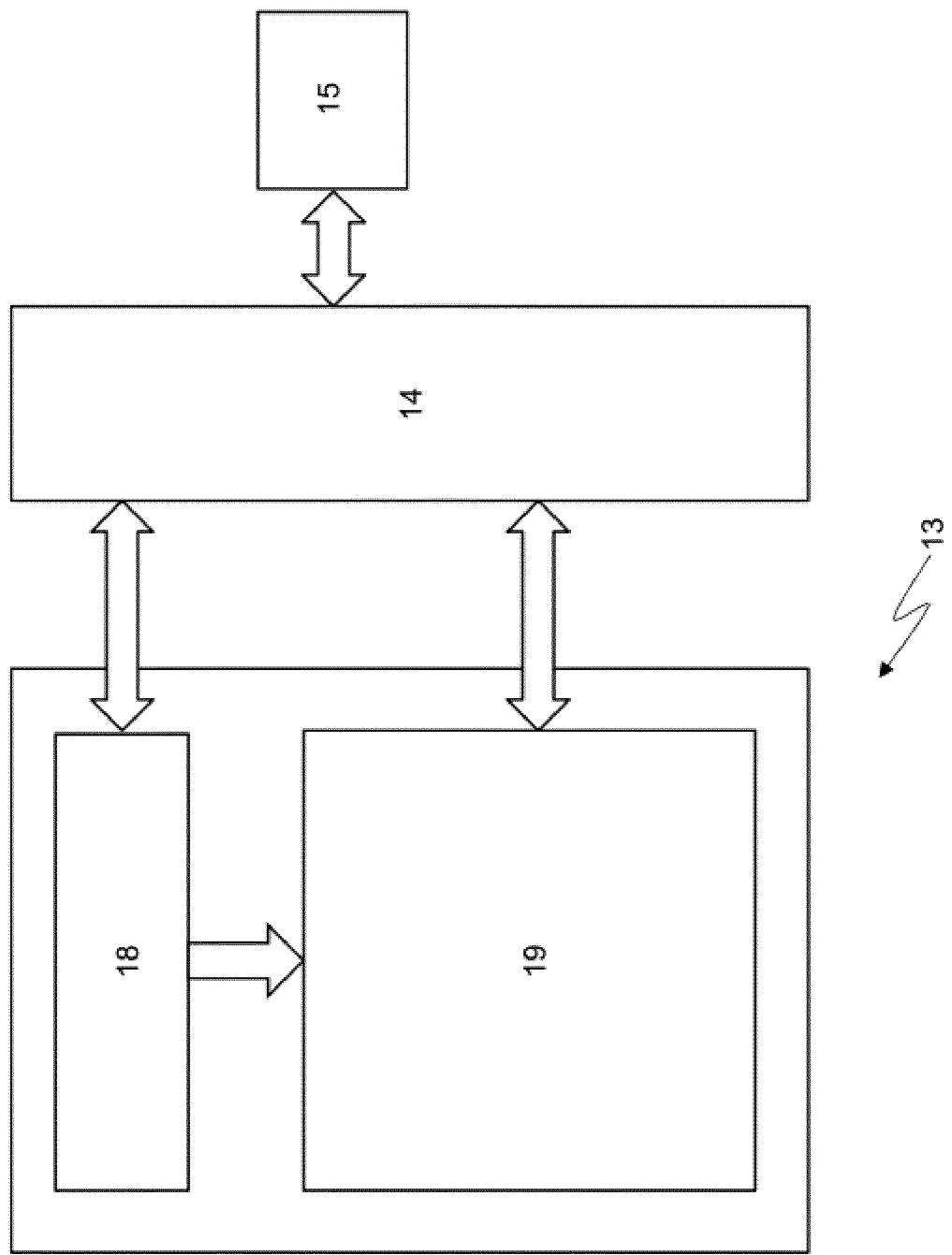
FIG. 2 is a block diagram of control components of the balancing system and part of the relative software.

As illustrated in FIG. 2, the software 13 of the control system 11 comprises a service application 18 and a management application 19, both of them being configured to interface with the processing and control electronics 15 by means of the communication system 14 independently from each other. The service application 18 is configured to perform a limited number of tasks only when the rotating part, in particular the control system 11, receives the power supply (i.e. it is turned on), while the management application 19 (which constitutes the firmware of the balancing head 7) is configured to perform all the management of the balancing head 7 and of the associated vibration sensor 10 during the normal operation. In particular, when the control system 11 is powered, or receives the power supply after a suspension, or after a period of absence of power (that is when it is turned on), only the service application 18 automatically starts up and is configured to perform, according to the commands received from the processing and control electronics 15, the necessary steps either to start the normal operation of the balancing system or to perform a software update. In particular, if the balancing system must normally operate then the service application 18 starts the management application 19 and stops until the next turning on. If, on the contrary, it is necessary to perform a software update, the service application 18 does not start the management application 19 and gets ready to receive (through the communication system 14) code packets from the processing and control electronics 15 code. The service application 18 writes the code packets to the memory of the hardware 12 by overwriting the previous, existing version of the management application 19, and the latter obviously cannot be started until the completion of the update. More specifically, when the update is completed, the service application 18 can stop after having started the management application 19, or can turn off the control system 11.

During a mechanical working in which the grinding wheel 5 is in contact with a workpiece under processing or during the maintenance of the grinding wheel 5 in which the grinding wheel 5 is in contact with a dressing tool (dresser), the management application 19 of the software of the control system 11 uses the communication system 14 for continuously transmitting, preferably in analog form, a reading of the vibration sensor 10. At the same time, the management application 19 cyclically reads the current value of one or more parameters of the rotating part by means of one or more sensors that are present in the rotating part, for example in the balancing head 7 and/or in the hardware 12 and/or in the second transceiver device 17 (for example one or more temperature sensors that detect the temperature of the rotating part) and checks whether the current value of the parameter (or parameters) is within a range of acceptable values. If the current value of at least one parameter (for example a temperature value of the rotating part) is significantly outside the corresponding range of acceptable values (for example if the detected temperature is too high) then the management application 19 stores in the memory of the hardware 12 the recording of the detected anomaly and interrupts the transmission of the reading of the vibration sensor 10. When the reading of the vibration sensor 10 is interrupted, the processing and control electronics 15 generates an alarm and transmits it to the control unit 20 of the machine tool 1 which, on the basis of the provisions of a relative control program, can decide to immediately stop the operation in progress. In addition, the processing and control electronics 15 requests the control system 11 of the rotating part, more specifically the management application 19, to restart the analog reading of the vibration sensor 10. In response to this request from the processing and control electronics 15, the management application 19 is programmed not to restart the analog reading of the vibration sensor 10 but to communicate in digital form the anomaly that has been just recorded and as a consequence of which the analog reading of the vibration sensor 10 was interrupted and then entrust the processing and control electronics 15 with the final decision on how to proceed.

What has been described so far refers to the preferred case in which the reading of the vibration sensor 10 is transmitted in analog form. If, on the other hand, the reading of the vibration sensor 10 is processed and digitized in the rotating part and is digitally transmitted to the processing and control electronics 15, it is possible to associate this transmission with a digital signal that identifies the anomaly as soon as it is detected. In this case, therefore, the transmission of the reading of the vibration sensor 10 is not interrupted, and writing of recording of the anomaly to the memory of the hardware 12 is optional, recording which can still be useful for subsequent processing.

In the embodiment illustrated in the attached figures, the control system 11 of the rotating part comprises a single hardware 12 (i.e. a single microcontroller). According to other embodiments not shown, the control system 11 of the rotating part has a modular architecture, with a plurality of hardware 12, typically two or three hardware 12 (i.e. two or three microcontrollers) physically separated and connected to one another for example by means of a BUS communication channel. In this case, all the hardware 12 of the control system 11 have a similar structure and are controlled by the same type of software 13 that is divided into a service application 18 and a management application 19 of its own.

In the embodiment shown in the attached figures the spindle 3 of the machine tool 1 supports a single grinding wheel 5. According to another embodiment not illustrated, the spindle 3 of the machine tool 1 supports two grinding wheels 5 which are arranged at the two opposite ends of the spindle 3.

In the embodiment illustrated in the attached figures the balancing system comprises a rotating part with a single balancing head 7. while according to another embodiment, not illustrated, the rotating part of the balancing system comprises several balancing heads 7. For example two balancing heads 7 can be arranged at the two opposite ends of the spindle 3 in embodiments comprising a single grinding wheel 5 or two distinct grinding wheels 5.

As previously said, the balancing head 7 is equipped with two balancing masses 8, for instance coplanar masses, which can rotate around the rotation axis 4 of the spindle 3, so as to compensate for the unbalance present in the grinding wheel 5. If it is sufficient to correct the unbalance in one plane only, one balancing head 7 is sufficient. In some cases it is necessary to correct the unbalance on both sides of the spindle 3, therefore it is necessary to use two balancing heads 7, suitably coordinated and arranged at opposite ends of the spindle 3. The use of a single balancing head 7 entails the piloting of two balancing masses 8, while the use of two balancing heads 7 entails the piloting of four balancing masses 8 (two for each balancing head 7).

There are basically two strategies for balancing the grinding wheel 5, a heuristic strategy and a deterministic strategy. The heuristic strategy is based on the execution of an action, the observation of the result, and the planning of the next action, until the unbalance is canceled, or the unbalance is reduced below a predetermined threshold value, the unbalance being detected by at least one specific vibration sensor (low frequencies), not shown in the figures, connected to the frame 2 of the machine tool 1 in a known way. If the action taken, e.g. a specific movement of the balancing masses 8, goes in the direction of the reduction of the unbalance, it is proceeded in the same direction, otherwise a different action is developed. The deterministic strategy is based on the calculation of the unbalance vector and therefore of the position that the balancing masses 8 of the balancing head 7 (or balancing heads 7) must take in order to cancel it. In order to implement this type of strategy, an accurate knowledge of the position, e.g. the angular position, of the balancing masses 8 of the balancing head 7 is required, which can be obtained by using appropriate position sensors or other devices, for example angular encoders.

If a heuristic strategy is used, position sensors or encoders in the balancing head 7 are not necessary, but "neutral position" sensors, or "home" sensors, capable of detecting when the balancing masses 8 of the balancing head 7 are in such a position to cause zero unbalance on the rotating part, are useful.

The two strategies can be mutually combined, for example in a balancing process including a first phase in which a deterministic type strategy is adopted for substantially reducing the unbalance, and a second refinement phase in which a heuristic type strategy allows to further reduce and substantially cancel the residual unbalance.

A control system 11 capable of driving more balancing heads 7, e.g. two balancing heads, by adopting both possible strategies makes the system more flexible and easily adaptable to specific application needs.

There are two main way of driving the electric motors 9 which move the balancing masses 8 of a same balancing head 7 under the control of the control system 11 of the rotating part. More specifically, the two balancing masses 8 can be moved simultaneously or alternately, that is one at a time. If the application has a rotating part with two balancing heads 7 on the same spindle 3, the same principle applies, that is the two balancing heads 7 can be simultaneously or alternately driven by the control system 11. Depending on the combinations used, one or more balancing masses 8 can be simultaneously moved, from a minimum of one to a maximum of four.

An additional aspect of a balancing system according to the invention consists in the possibility of easily varying the bandwidth and the gain, which simplifies the configuration of the application program of the processing and control electronics 15 which processes the analog signal supplied by the vibration sensor 10 and increases its effectiveness.

A balancing system according to the present invention can be differently embodied with respect to what is schematically shown in the figures and described so far. The control system 11 can for example be partially or totally integrated in the second transceiver device 17 or be integral with it, connected to the balancing head 7 by means of the coiled electric cable. A different alternative consists in achieving the rotating part as an integral piece, that is in this case the second transceiver device 17, the control system 11 and the balancing head 7 are parts of a single element or of elements rigidly connected to each other, and there is no coiled electric cable.

The rotating part of a balancing system according to the present invention that, as already mentioned above, can be achieved in a single piece, can also be arranged at one end of the spindle 3 instead of being housed in the axial opening 6 of the spindle 3.

According to other embodiments of the present invention that are not illustrated, the spindle 3 of the machine tool 1 could mount a rotating tool different from the grinding wheel 5.

The embodiments herein described can be combined with each other without departing from the scope of the present invention.

The control method described above has a number of advantages.

First of all, the control method described above allows to update the software 13 of the control system 11 of the rotating part in a simple and quick way since the software 13 update is performed without any physical intervention by an operator to disassemble and reassemble mechanical parts and electrically connect and disconnect them using cables and proper connectors. In other words, the management application 19 (that is the firmware of the balancing head 7) can be directly updated by the processing and control electronics 15 without requiring any physical interventions by the operator, more specifically interventions potentially complex and delicate interventions which inevitably and considerably slow down the process of update and consequently lengthen the period in which the machine tool does not have the possibility to operate. In this regard, it is important to note that the service application 18 does not require any type of update as it only performs two simple and quick tasks and therefore there is no real advantage in making the service application 18 faster and/or more efficient as it is largely sufficient that the service application 18 is effective, that is it is sufficient that it correctly performs the two above-mentioned tasks. Of course, in case of need the service application 18 can in any case be updated by disassembling the hardware 12 in order to physically connect the latter to an external computer.

Having diagnostic functions that are always active and therefore able to promptly communicate the occurrence of malfunctions or environmental phenomena that may damage the control system 11 of the rotating part—and, as a consequence, the spindle 3 and/or the grinding wheel 5—increases the reliability of the application and of the machine tool 1. Promptly knowing the occurrence of malfunctions or potential problems can prevent serious damage to the spindle 3 and/or the grinding wheel 5. If there are environmental changes, such as for example an increase of the temperature inside the spindle 3, which can cause damages to the system, a prompt transmission of this information to the processing and control electronics 15 allows the control unit 20 of the machine tool 1 to take actions in order to prevent damages.

Finally, the implementation of the control method described above does not entail any cost increase as the software 13 composed of the two applications 18 and 19 does not require any additional or more performing hardware with respect to the one that is normally employed in the known balancing systems.

A stationary control system having hardware (e.g. a microcontroller) and software may be provided for in the stationary part, e.g. in the processing and control electronics 15, and that such software may include a service application and a management application having features and way of operating similar to the ones of the above described service and management applications 18 and 19 of the software 13 in the control system 11 of the rotating part.

The invention claimed is:

1. A balancing system for a rotating spindle of a machine tool, the balancing system comprising:
   a rotating part connected to the spindle, the rotating part comprising:
      at least one balancing head comprising:
         at least one balancing mass eccentrically arranged with respect to a rotation axis, and
         at least one electric motor configured to adjust the position of the balancing mass;
      at least one vibration sensor; and
      a control system comprising at least one processor and at least one memory storing software configured to be executed by the at least one processor;
   a stationary part comprising processing and control electronics; and
   a wireless communication system configured to establish communication between the control system and the processing and control electronics,
   wherein the software stored on the at least one memory of the control system comprises:
      a management application that, when executed by the at least one processor, is configured to manage the balancing head and the vibration sensor; and
      a service application that, when executed by the at least one processor, is the only application started after the control system is powered on, and is configured to automatically not start the management application, receive code packets corresponding to an updated version of the management application from the processing and control electronics through the wireless communication system, and overwrite the existing version of the management application with the updated version of the management application.

2. The balancing system of claim 1, wherein the service application and the management application, when executed by the at least one processor, are configured to interface with the wireless communication system independently.

3. The balancing system of claim 1, wherein:
   the rotating spindle carries a grinding wheel, and
   the management application, when executed by the at least one processor, is configured to, via the wireless communication system, continuously transmit readings of the vibration sensor to the processing and control electronics while the grinding wheel is in contact with a workpiece or while the grinding wheel is in contact with a dressing tool.

4. The balancing system of claim 3, wherein:
   the rotating part further comprises at least one other sensor, and
   the management application, when executed by the at least one processor, is configured to:
      cyclically receive values of at least one parameter of the rotating part from the at least one other sensor while the grinding wheel is in contact with the workpiece or while the grinding wheel is in contact with the dressing tool, and
      compare the received values of the at least one parameter to a range of acceptable values.

5. The balancing system of claim 4, wherein the management application, when executed by the at least one processor, is configured to:
store, in the at least one memory, a recording of a detected anomaly when the received values of the at least one parameter are outside the range of acceptable values, and
interrupt the transmission of the readings of the vibration sensor.

6. The balancing system of claim 5, wherein the management application, when executed by the at least one processor, and after interruption of the transmission of the readings of the vibration sensor, is configured to send, to the processing and control electronics, the previously stored recording of the detected anomaly.

7. The balancing system of claim 5, wherein the management application is configured to continuously transmit readings of the vibration sensor to the processing and control electronics in analog form.

8. The balancing system of claim 5, wherein the management application, when executed by the at least one processor, and after interruption of the transmission of the readings of the vibration sensor, is configured to generate an alarm.

9. The balancing system of claim 4, wherein the management application is configured to continuously transmit readings of the vibration sensor to the processing and control electronics in digital form.

10. The balancing system of claim 9, wherein the management application, when executed by the at least one processor, is configured to:
store, in the at least one memory, a recording of a detected anomaly when the received values of the at least one parameter are outside the range of acceptable values, and
not interrupt the transmission of the readings of the vibration sensor.

11. The balancing system of claim 4, wherein the at least one other sensor is a temperature sensor.

12. The balancing system of claim 1, wherein the wireless communication system is an optical communication system.

13. The balancing system of claim 1, wherein the wireless communication system comprises a first transceiver device within the stationary part and connected to the processing and control electronics, and a second transceiver device within the rotating part and connected to the control system.

14. The balancing system of claim 13, wherein the wireless communication system further comprises a wireless power transmission system.

15. The balancing system of claim 14, wherein the wireless power transmission system comprises an air-core transformer comprising a primary winding arranged in the first transceiver device and a secondary winding arranged in the second transceiver device.

16. The balancing system of claim 1, wherein the control system is powered on after a period of absence of power.

17. The balancing system of claim 1, wherein the service application does not require an update.

18. The balancing system of claim 1, wherein the updated version of the management application is started after completion of reception of the code packets corresponding to the updated version of the management application and completion of overwriting of the existing version of the management application with the updated version of the management application.

* * * * *